H. B. CRUM.
BRICK LIFTING TRUCK.
APPLICATION FILED MAR. 7, 1913.
1,121,982.
Patented Dec. 22, 1914.
2 SHEETS—SHEET 2.
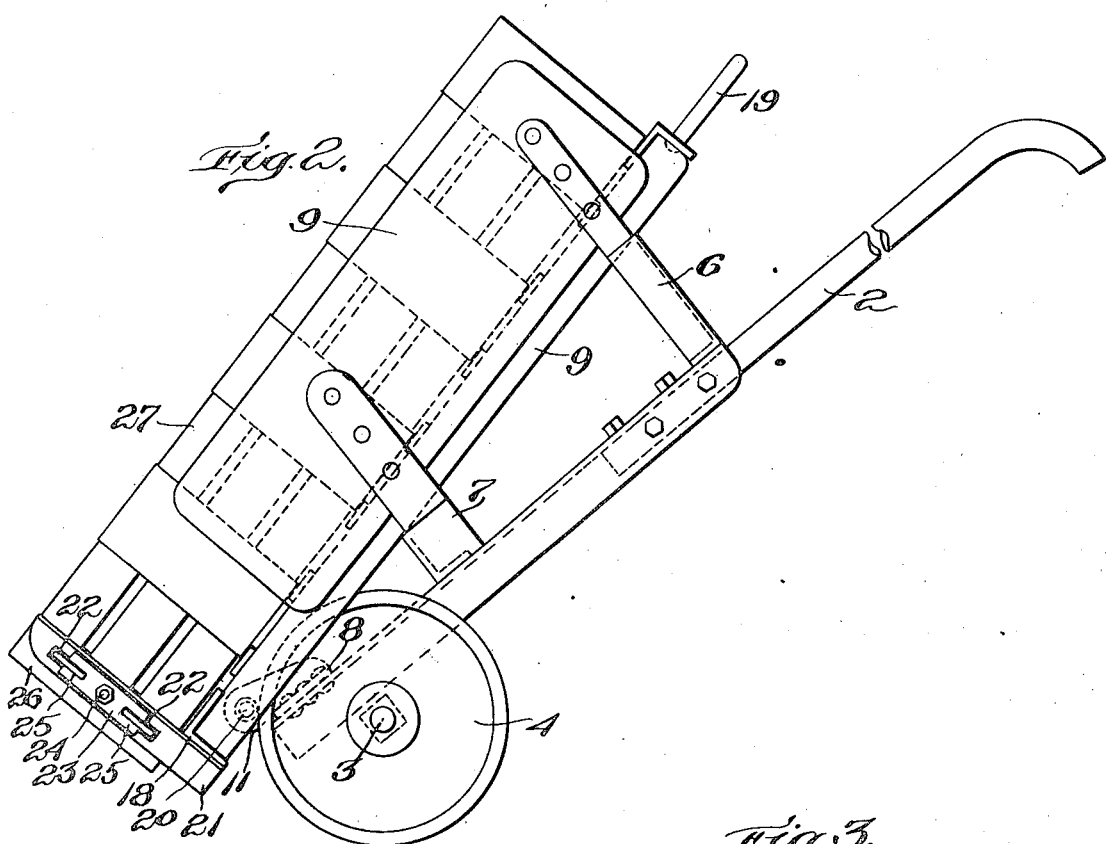
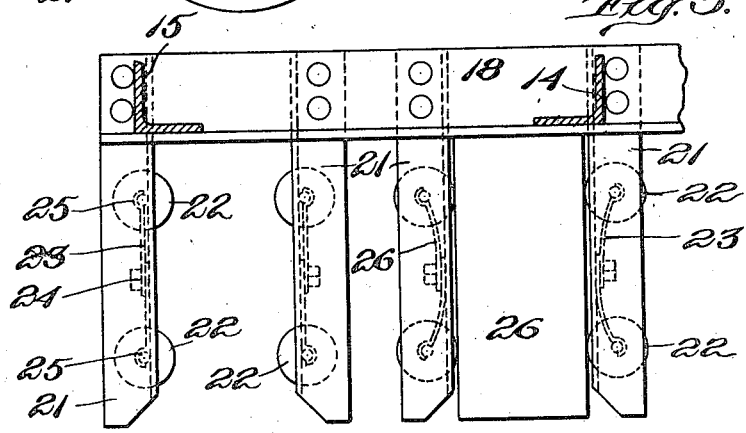
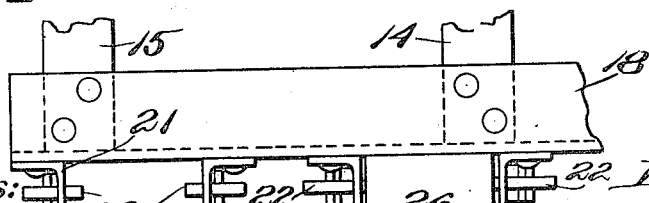
Witnesses:
James R. Hodder
Edward Maxwell
Inventor:
Hollis B. Crum,
by Geo. H. Maxwell,
atty.

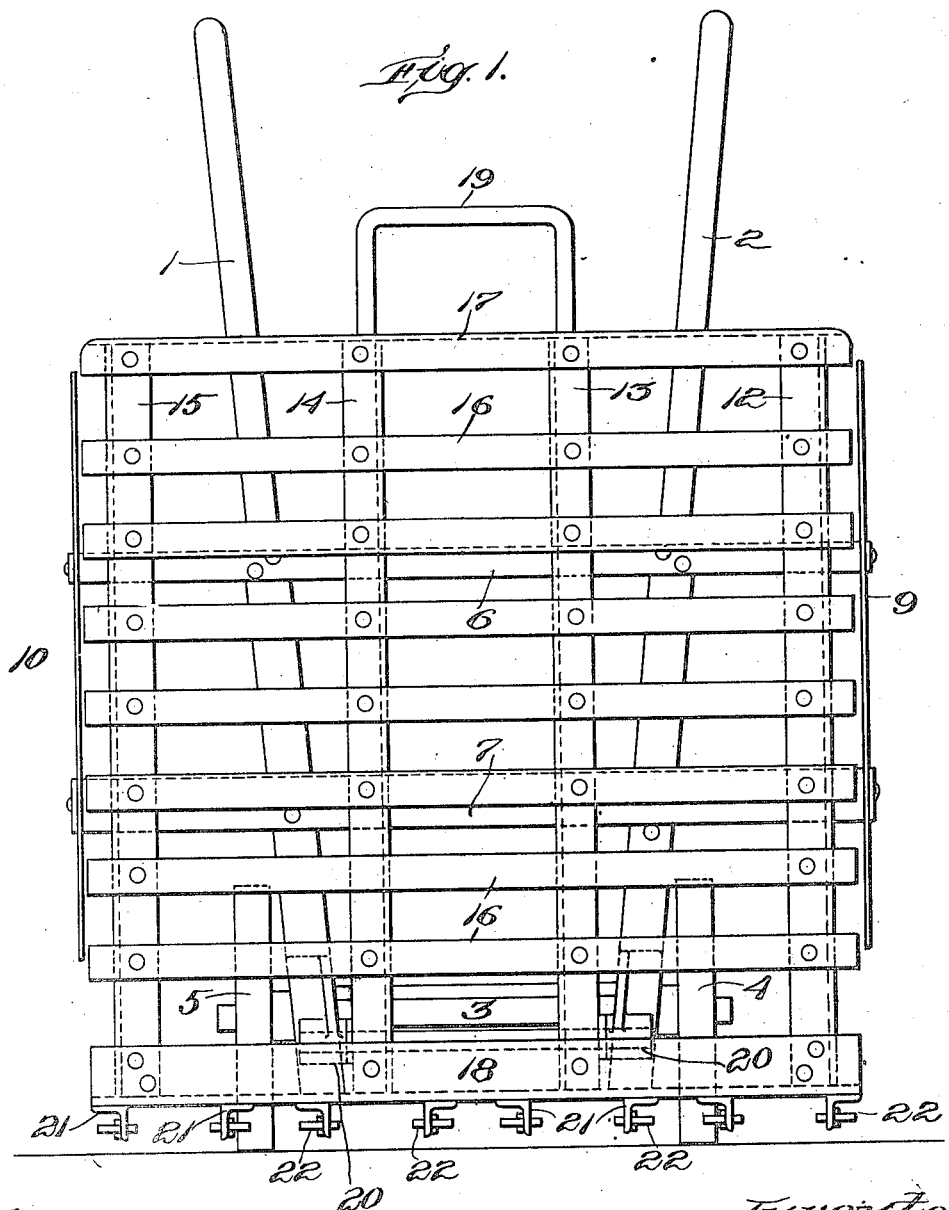

UNITED STATES PATENT OFFICE.

HOLLIS B. CRUM, OF CHICAGO, ILLINOIS, ASSIGNOR TO RAYMOND C. PENFIELD, OF NEW YORK, N. Y.

BRICK-LIFTING TRUCK.

1,121,982.     Specification of Letters Patent.     Patented Dec. 22, 1914.

Application filed March 7, 1913. Serial No. 752,612.

*To all whom it may concern:*

Be it it known that I, HOLLIS B. CRUM, a citizen of the United States, and resident of Chicago, county of Cook, State of Illinois, have invented an Improvement in Brick-Lifting Trucks, of which the following description, in connection with the accompanying drawings, is a specification, like letters on the drawings representing like parts.

This invention relates to mechanical means for transferring bricks, and more particularly to a hand truck arranged for automatically lifting bricks directly from the ground, preparatory to transporting the same by said truck.

The object of my present invention is to provide a hand truck of convenient size and form to be easily manipulated by one man, and which truck has means to automatically lift an entire pile of brick, transport the same while in its stacked formation and redeposit the stacked pile of brick in its original position, ready to be again taken up by another mechanical lifting device, or by a similar hand truck or other brick lifter.

In the art of transporting brick by means of mechanical lifters, an entire stack of brick, piled in a predetermined formation, is ordinarily lifted and moved by means of heavy apparatus, necessitating a crane, block and tackle, or other mechanical power devices to manipulate the same, but heretofore no mechanical brick lifter in the form of a hand truck has been satisfactory. The old fashioned hand wheel barrow, which must be loaded by hand, is still ordinarily employed, where such a hand truck can be used, although I am aware that brick trucks have been devised, but such trucks were incapable of lifting an entire stack, including the bottom rows of brick, and redepositing said stack in position where it could be again transported by a similar truck or other mechanical lifter.

Preferably I embody my present invention in connection with a hand truck of ordinary size, such as is used in transporting trunks, barrels, etc., and provide a framework thereon which may be of suitable size to carry a stack of one hundred brick or more, together with means which enables said truck to automatically lift and carry the bottom lines of brick supporting the pile, hold same in their proper relative position during the wheeling of the truck to a new location, and redepositing the entire stack including the bottom lines of brick in the new location, and in the same formation as originally stacked, and then releasing the truck from the entire stack without disarranging the brick formation.

Other objects of the invention, details of construction and combinations of parts will be hereinafter more fully pointed out and claimed.

Referring to the drawings, wherein a preferred embodiment of the invention is illustrated, Figure 1 is a view of the truck and framework in position to engage a stack of brick; Fig. 2 is a side view of the truck having a pile of brick thereon in position for transporting same; and Figs. 3 and 4 are detail views illustrating the automatic means for engaging and lifting the bottom lines of brick.

It will be understood that in mechanical brick lifting or setting devices it is necessary to stack the brick to be lifted in a suitable pile with the bottom lines of brick supporting and maintaining the entire stack in an open formation with spaces between the foundation or supporting lines of brick. Accordingly, my present invention provides a hand truck having a plurality of lifting bars adapted to be positioned under the pile of brick between the foundation bricks together with means which will automatically engage and lift the foundation bricks and hold them in their relative position with the rest of the stack, during transporting of the entire pile and enable the pile to be redeposited upon the foundation bricks and thus facilitate the removal of the truck as well as leave the pile in position to be again engaged by a similar truck or other mechanical lifter.

A truck similar to the wellknown baggage truck is shown having side or handle bars 1 and 2 mounted upon an axle 3 which carries wheels 4 and 5 at either end in the usual manner. Secured to the handle bars 1 and 2 are cross bars 6, 7, and 8 to which the framework intended to carry the pile of brick is secured. These cross bars are preferably bolted to the handle or side bars 1 and 2 and may be strengthened by angle irons or secured in any other firm and suitable manner. Secured to the outer ends of the cross bars 6 and 7 I provide sides or guards 9 and 10, which are preferably of a length substantially equal to that of the framework carrying the brick.

In order to facilitate the manipulation of the brick lifting, transporting, and redepositing operations, I provide the open framework intended to contact with and carry the stack of brick, with a capability of being swung on a pivot independently of the truck itself, the whole hand truck of course being adapted to swing on the axle 3 as its pivot. Therefore, I secure to the cross bar 8 at the axle end of the truck flanges 11, to which the open framework may be pivoted. This framework preferably comprises a plurality of angle irons 12, 13, 14, and 15 on which are riveted a suitable number of bars 16, the end bars 17 and 18 being preferably angle irons similar to those comprising the members 12—15. The central longitudinal members 13 and 14 are preferably fitted with an extension 19 to constitute a handle within convenient reach of the operator to manipulate the framework and swing the same on its pivot when desired. This entire framework is pivotally supported by the central bars 13 and 14 being pivoted at 20 to the flanges 11 as shown in dotted lines in Figs. 1 and 2.

Secured to the lower angle bar 18 are a plurality of lifting arms 21 preferably of angle iron, having one end portion secured by bolts or rivets to the depending flange of the angle iron 18 and extending in a direction at right angles thereto, as illustrated in Figs. 2 and 3, a distance substantially equal to the length of a standard brick, to constitute lifting arms to carry the pile of brick above the bottom row, and the lower depending flange of the angle irons 21 are provided with automatic brick engaging devices to engage and lift the bottom lines of brick.

It will be readily understood that the brick intended to be lifted and transported by this truck is piled with the bottom lines of brick in open formation as already mentioned, to facilitate the positioning of the lifter about the stack with the arms 21 beneath the same, and alternately between the foundation or supporting bricks. Preferably I provide the arms 21 with automatic brick lifting devices adapted to frictionally engage and lift the bottom brick of the pile. Such automatic devices may conveniently comprise a plurality of disks or wheels 22 projecting through appropriate slots provided therefor in the depending flanges of the arms 21, and being yieldingly held projecting through said slots by means of springs 23, each spring being riveted at 24 to the flange of the arm, and having forked arms 25 at either end to partially encircle the axle of the disks 22. As illustrated in Figs. 3 and 4, upon positioning the arms 21 under the pile of stacked brick, the disks 22 are yieldingly held against the surface of a brick 26 engaged between them, constituting anti-friction devices to facilitate the positioning of the setter underneath the pile, and when so positioned, the action of the springs 23 will exert a sufficient frictional tension through the disks 22 on the brick 26 to enable such bottom brick to be lifted. When the stack is deposited, the weight of the superimposed brick load, designated generally as 27, will be rested upon the bottom bricks 26 and will hold the same while the truck is backed away from the stack. The guards 9 and 10 prevent a lateral displacement of the stack during transportation of the stack and the weight of the entire pile acts to hold the brick in its normal relative stacked formation.

Preferably I provide the cross members 6, 7, and 8 of a suitably decreasing height, so as to maintain the framework supporting the brick stack at such an angle that, during the wheeling of the truck, the entire load is substantially centered over the axle 3 of the truck, while enabling the handles 1 and 2 to be at the most suitable and convenient height for the operator. This construction is clearly shown in Fig. 2, and enables the operator to handle a much heavier weight than would be possible otherwise and with greater ease, rapidity and facility. The entire brick supporting framework, including the lifting arms 21 may be easily swung upon the pivots 20 by means of the handle 19, such handle being within easy reach of the operator and affording a long and powerful leverage to swing the entire stack of brick off the ground by simply tilting the same slightly and thus enabling the truck to be quickly loaded.

The operation of my hand truck will be now described. A suitable stack of brick, say 100 or more, having been arranged with the foundation brick in open formation, as previously explained, the attendant wheels the truck in position, as shown in Fig. 1, positioning the same in front of the pile and manipulating the truck to slide the arms 21 under the pile through the interstices between the supporting brick, which have been properly arranged so that the alternate pairs of arms 21 may slide between the same, and the spring pressed rollers 22 engage each foundation brick as shown in Fig. 3. This engagement of the foundation row of brick is entirely automatic and the rollers facilitate the positioning, as well as the removal of the entire brick truck from the stack while the same is resting on the ground either before being transported or after being redeposited from the truck. The operator then by means of the handle 19 lifts the entire stack, tilting it on to the truck and until the framework rests against the cross bars 6 and 7, when the handles 1 and 2 may be lowered still farther lifting the brick load 27 from the ground and centering it over the axle 3 when the entire load may be easily wheeled along by the operator. To deposit the brick load from the truck, the operator having wheeled the same to desired position, raises the handles 1 and 2, permitting the truck and its load to assume the position shown in Fig. 1 with the lowermost edge of the foundation bricks 26 resting on the ground, when the entire truck is withdrawn from the stack. If desired, the operator can tilt the entire framework on the pivot 20, lowering the stack of brick by means of the handle 19, but this is not the preferred manner of operation.

It will thus be seen that I have provided a hand truck capable of easy and ready manipulation to lift an entire stack, including the foundation row of brick from the ground by means of a slight tilting action, such tilting being readily accomplished by reason of the long leverage secured. A relatively slight tilting movement lifts the entire stack from the ground and supports it on the truck, owing to the position of pivots 20. The load being centered over the wheels of the truck enables a greater number and weight of brick to be handled by such a truck than would be otherwise possible and the automatic devices to engage the bottom row of brick enable the stack to be redeposited in its original formation ready to be again transported by a similar truck or any other mechanical lifter.

One of the important features of my invention is that I secure a lifting of the entire load through a slight tilting action, freeing the load from the ground without depending upon the tilting of the truck proper, the leverage afforded by the long bars 13 and 14 and handle 19 being much more powerful than a similar tilting of the truck itself on the wheels 4 and 5. It will be apparent that the weight of the load which an operator could handle, depending upon the lifting action secured by a tilting of the wheels of the truck is much less than that which he can readily transport by means of my invention.

An additional feature of great practical importance is the automatic means to lift the foundation row of bricks, this being a distinct novelty in the art, as applied to a hand truck, and as applied also to a mechanical lifter which depends upon a tilting action to lift the stack of brick, and I desire to claim the same broadly.

While I have shown and described my invention as handling brick of usual form and standard size, it is of course not limited to this use. The handling of hollow tile, artificial stone blocks, and any similar articles can be equally lifted, carried and deposited by adapting the lifting fingers and roller disks to fit such articles.

Having described my invention, what I claim as new and desire to secure by Letters Patent is:

1. A brick truck of the class described, comprising a truck frame, a brick carrying frame pivotally secured to the truck frame and adapted to engage a stack of brick by applying said pivotal frame substantially vertically to the brick stack, having means thereon to engage and lift the foundation row of said brick stack, and supporting means on the truck frame to hold the brick engaging frame substantially balanced over the truck wheels.

2. A brick truck of the class described, comprising a truck frame, a brick carrying frame pivotally secured to the truck frame and adapted to engage a stack of brick by applying said pivotal frame substantially vertically to the brick stack, said frame being constructed and arranged to lift the entire brick stack, including the bottom row, by a tilting movement on said pivot, and means on the truck to hold said frame in tilted position.

3. A brick truck of the class described, comprising a truck frame, a brick carrying frame pivotally secured to the truck frame and adapted to engage a stack of brick by applying said pivotal frame substantially vertically to the brick stack, said frame being constructed and arranged to engage and lift a pile of brick stacked in predetermined formation, including the lifting of the foundation row of said pile, by tilting said frame on said pivot, and means on the truck to hold said frame in tilted position.

In testimony whereof, I have signed my name to this specification, in the presence of two subscribing witnesses.

HOLLIS B. CRUM.

Witnesses:
F. C. HAFLEY,
S. K. SMART.